United States Patent
Franqueville

(10) Patent No.: US 7,964,041 B2
(45) Date of Patent: Jun. 21, 2011

(54) INSTALLATION AND METHOD FOR DRIVING A SUBMARINE PIPELINE SCRAPER

(75) Inventor: Jean-Baptiste Franqueville, Puteaux (FR)

(73) Assignee: Technip France (FR)

( * ) Notice: Subject to any disclaimer, the term of this patent is extended or adjusted under 35 U.S.C. 154(b) by 611 days.

(21) Appl. No.: 11/575,237

(22) PCT Filed: Sep. 27, 2005

(86) PCT No.: PCT/FR2005/002391
§ 371 (c)(1),
(2), (4) Date: Mar. 26, 2007

(87) PCT Pub. No.: WO2006/035158
PCT Pub. Date: Apr. 6, 2006

(65) Prior Publication Data
US 2008/0053481 A1  Mar. 6, 2008

(30) Foreign Application Priority Data
Sep. 30, 2004 (FR) ...................... 04 10348

(51) Int. Cl.
B08B 9/04 (2006.01)
B08B 9/053 (2006.01)
B08B 9/055 (2006.01)

(52) U.S. Cl. ............. 134/22.12; 134/166 C; 134/8; 15/104.061; 15/104.16; 405/154.1; 405/184.1

(58) Field of Classification Search ........... 134/8, 22.12, 134/166 C; 405/154.1, 184.1; 15/104.061
See application file for complete search history.

(56) References Cited

U.S. PATENT DOCUMENTS

| | | | |
|---|---|---|---|
| 3,473,961 A * | 10/1969 | Dege et al. | .......... 134/8 |
| 5,358,573 A | 10/1994 | Sivacoe et al. | |
| 5,433,236 A | 7/1995 | Zollinger et al. | |
| 6,840,088 B2 * | 1/2005 | Tucker et al. | ........... 73/49.5 |
| 7,406,738 B2 * | 8/2008 | Kinnari et al. | ........... 15/3.5 |

FOREIGN PATENT DOCUMENTS

| | | |
|---|---|---|
| GB | 2 325 293 A | 11/1998 |
| WO | WO 97/10943 | 3/1997 |
| WO | WO 03/031865 A | 4/2003 |

OTHER PUBLICATIONS

International Search Report PCT/FR2005/002391 dated Jan. 18, 2006.

* cited by examiner

*Primary Examiner* — Michael Kornakov
*Assistant Examiner* — Natasha Campbell
(74) *Attorney, Agent, or Firm* — Ostrolenk Faber LLP

(57) ABSTRACT

An installation for and a method for driving a submarine pipeline scraper, wherein one of the ends of the pipeline has a launch device and the other end has a receiving device. The scraper defines an upstream chamber and a downstream chamber. It can be launched inside the pipeline from the launch device in the direction of the receiving device, allowing water to enter through the launch device in order to subject the upstream chamber to hydrostatic pressure. The receiving device is identical to the launch device, such that water can enter through the receiving device in order to balance the pressure of the two chambers, and also enables a fluid to be injected into the downstream chamber to drive the scraper toward the launch device.

10 Claims, 2 Drawing Sheets

INSTALLATION AND METHOD FOR DRIVING A SUBMARINE PIPELINE SCRAPER

CROSS REFERENCE TO RELATED APPLICATION

This is a 35 U.S.C. §§371 national phase conversion of PCT/FR2005/002391, filed Sep. 27, 2005, which claims priority of French Application No. 0410348, filed Sep. 20, 2004. The PCT International Application was published in the French language.

BACKGROUND OF THE INVENTION

The present invention relates to an installation and a method for driving a scraper for subsea pipes.

One envisioned field of application is particularly that of rigid subsea pipes designed for transporting hydrocarbons which need to have scrapers or "pigs" driven along inside them in order to clean them or to inspect them using inspection devices.

Customarily, subsea pipes are laid on the seabed where there is a hydrostatic pressure that is determined by the depth of water above. They are equipped at each of their two opposite ends with devices that allow the scraper to be propelled along inside the pipe.

One of the ends is equipped with a launch device in which the scraper is initially installed, while the other end is equipped with a receiver trap device that allows the scraper to be retrieved once it has been launched by the launch device and driven in its sliding movement through the pipe.

In order to be able to propel this scraper through a pipe, the scraper needs to have translational mobility while at the same time demarcating the pipe into two appreciably watertight chambers, an upstream chamber at the launch device end and a downstream chamber at the receiver trap device end. With said pipe initially at an internal pressure lower than said hydrostatic pressure, for example at atmospheric pressure, the scraper is then launched into said pipe from said launch device toward said receiver trap device, allowing water from said seabed to enter via said launch device in order to bring said upstream chamber to said hydrostatic pressure.

Reference may be made to document WO 97/10943, which describes such a scraper and an installation that allows it to be moved along inside a pipe in order in particular to drive a riser therein.

However, the pipes between the launch device and the receiver trap device are sometimes damaged and deformed and are usually appreciably indented without necessarily being punctured, and this prevents the translational movement of the scraper. It then becomes necessary to dismantle the pipe or, sometimes, to section it in order to be able to retrieve the scraper. Such measures are quite obviously expensive.

One problem that arises and that the present invention aims to solve is therefore that of providing an installation and a method for driving a scraper that allows such measures to be avoided.

SUMMARY OF THE INVENTION

To this end, and according to a first subject, the present invention proposes a method for driving a scraper for a subsea pipe, said subsea pipe being designed to be laid on the seabed at a given hydrostatic pressure, said pipe, which has two opposite ends, being equipped at one of its ends with a launch device and at the other end with a receiver trap device, said scraper being designed to slide inside said pipe, therein delimiting two watertight chambers, an upstream chamber between said launch device and said scraper and a downstream chamber between said receiver trap device and said scraper, said scraper being able to be launched into said pipe from said launch device toward said receiver trap device, said method being of the type whereby said pipe is initially brought to an internal pressure lower than said hydrostatic pressure, then water from said seabed is allowed to enter via said launch device in order to bring said upstream chamber to said hydrostatic pressure in such a way as to drive said scraper toward said receiver trap device; according to the invention, said method further comprises the following steps: water is allowed to enter via said receiver trap device in order to equalize the pressure of the two chambers with respect to the hydrostatic pressure; and a pressurized fluid is injected into said downstream chamber via said receiver trap device in order to increase the pressure in said downstream chamber to a pressure higher than the hydrostatic pressure and drive said scraper in an opposite direction, toward said launch device, by means of which the respective roles of said launch device and of said receiver trap device are reversed.

Thus, one characteristic of the invention lies in this reversal of the roles of the launch device and of the receiver trap device, the former becoming a receiver trap device and the latter becoming the launch device whereas, according to the prior art, no arrangement was made for performing this role reversal. Thus, the launch device actually exhibits a cylindrical housing in continuation of which the pipe is coupled and which is not only designed to accommodate the scraper but also exhibits means for injecting water upstream of the scraper and doing so at a pressure corresponding to the hydrostatic pressure, which may be extremely high at great depths, or even at a pressure higher than the hydrostatic pressure. Whereas the receiver trap device itself, according to the prior art, is simply designed to trap the scraper when the latter reaches the end of its travel, so that it can be retrieved, and no special means are provided for bringing the downstream chamber to a pressure higher than the hydrostatic pressure.

Hence, according to the invention, by equalizing the pressure of the two chambers, upstream and downstream, once the scraper has, for example, become stuck in the pipe, the pressure in the downstream chamber is increased in such a way as to drive the scraper in reverse, toward the launch device from which it was launched. In that way, there is no need to dismantle the pipe in order to retrieve the scraper and free the pipe because it is driven in the opposite direction as far as the launch device.

Advantageously, initially said pipe is at an internal water pressure appreciably equal to atmospheric pressure. Thus, by filling the pipe with water it is difficult for the pipe to become compressed under the effect of the hydrostatic pressure or any accidents that might befall it.

Furthermore, according to one particularly advantageous embodiment, the water in said downstream chamber is released via said receiver trap device when said scraper is being driven toward said receiver trap device so as to allow it to progress through the pipe toward said receiver trap device, provided of course that it is not prevented from so doing by a deformation of the pipe for example.

Furthermore, according to an advantageous characteristic, the water in said upstream chamber which is at the hydrostatic pressure is released via said launch device when said scraper is being driven in said opposite direction so that the pressure in the upstream chamber is not equalized with that of the downstream chamber, because if it were, the scraper would remain stationary.

Advantageously, pressurized water is injected through said receiver trap device in order to increase the pressure in said downstream chamber to a pressure higher than the hydrostatic pressure, for example by means of a pump mounted on a remote controlled robot.

Furthermore, and as a preference, water is allowed to enter the launch device and the receiver trap device by means of a single controllable mobile system which is not only designed to filter the water, which contains a certain number of impurities, but is also designed to inject, for example, corrosion inhibitors which, in particular, play a part in passivating the internal surface of the pipe bared by the scraper. Such corrosion inhibitors are, for example, of the polyphosphate type.

According to another subject, the present invention proposes an installation for driving a scraper for a subsea pipe, according to the method described hereinabove. Furthermore, according to the invention, said receiver trap device is identical to the launch device so as to allow water to enter via said receiver trap device in such a way as to equalize the pressure of the two chambers with respect to the hydrostatic pressure. Furthermore, it is designed for injecting a pressurized fluid into said downstream chamber via said receiver trap device in such a way as to increase the pressure in said downstream chamber to a pressure higher than the hydrostatic pressure and to drive said scraper in an opposite direction, toward said launch device, by means of which the respective roles of said launch device and of said receiver trap device are reversed.

Thus, another characteristic of the invention lies in the use of a launch device that is structurally identical to the receiver trap device operating sometimes as a launch device and sometimes as a receiver trap device so that just one single standard device type is produced, thus allowing a significant reduction in production costs.

According to one particular embodiment of the invention, said receiver trap and launch devices are each equipped with a respective actuatable receiver assembly designed to be actuated to allow water to pass. These actuatable receiver members are mounted on both devices in the same way.

Furthermore, since the installation advantageously comprises water circulating means designed to be coupled removably to said actuatable receiver assembly in order to allow water to enter said devices, it is possible to allow water to enter one or other of said devices.

As a preference, the installation comprises a valve-forming venting device designed to be coupled to said actuatable receiver assembly in order to prevent water from entering said devices.

Other specifics and advantages of the invention will become apparent from reading the description, given hereinafter, of a particular embodiment of the invention, provided by way of nonlimiting indication, and with reference to the attached drawings.

DESCRIPTION OF A PREFERRED EMBODIMENT

Figure 1:
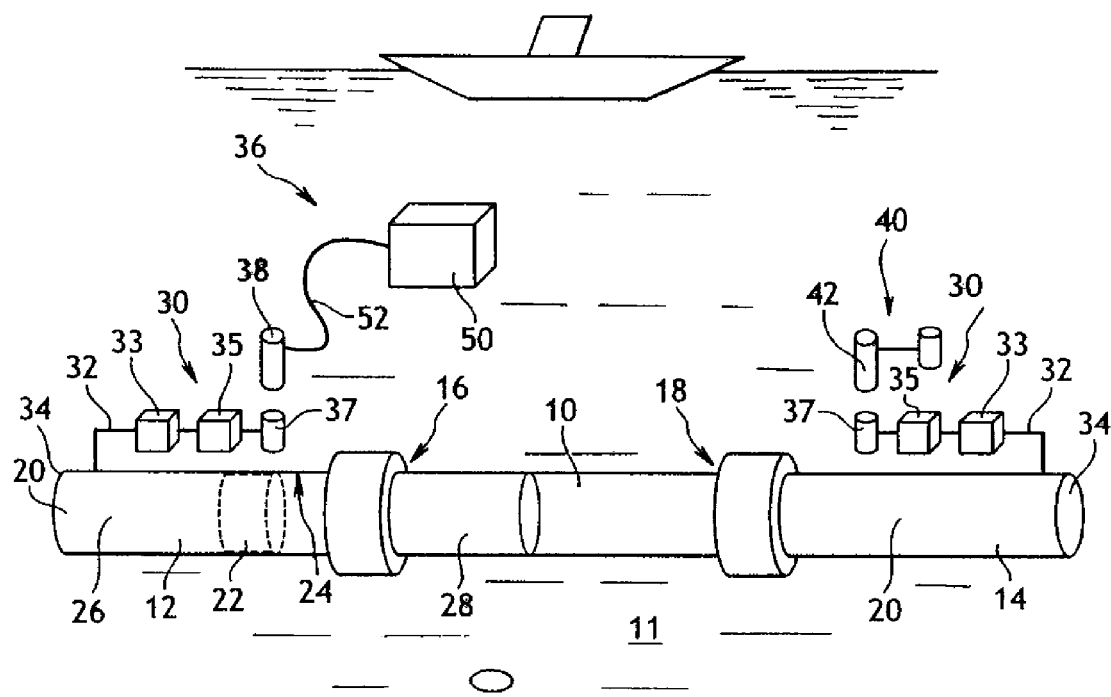
FIG. 1 is a schematic perspective view illustrating one embodiment of the invention according to a first step.

FIG. 1 shows an installation according to the invention, comprising a subsea pipe 10 laid out on the seabed 11 between a launch device 12 and a receiver trap device 14. For practical reasons, the subsea pipe 10 is depicted here as being far shorter than it would be in real life. It stretches between two opposite ends, a first end 16 and a second end 18, over a distance ranging between 10 meters or so and several kilometers.

The launch 12 and receiver trap 14 devices have identical structures, this structure consisting of a tubular body 20 the diameter of which is similar to that of the subsea pipe 10, and each can be coupled in the continuation of one of the two ends 16, 18 of the pipe 10.

Furthermore, the launch device 12 here has, housed inside the tubular body 20, a scraper 22 running circumferentially contiguous with an internal wall 24 in a substantially watertight manner so as to define an upstream chamber 26 and a downstream chamber 28 which for its part extends along inside the pipe 10.

In addition, said receiver trap 14 and launch 12 devices are each equipped with an actuatable receiver assembly 30 designed to be actuated in order to allow water to pass between the inside of said devices 12, 14 and the outside. To do this, the actuatable receiver assembly has a main pipe 32 coupled directly to a free end 34 of the tubular body 20, the main pipe 32 being extended by two shut-off valves 33, 35 and a coupling receptacle 37.

Furthermore, a valve-forming venting device 40 exhibiting a first connection member 42 can be connected to the actuatable receiver assembly 30. To do this, the first connection member 42 is engaged in the coupling receptacle 37 of the launch device 12 or of the receiver trap device 14 and the venting device 40 allows water to be dumped from the inside to the outside of the tubular body 20 at a given pressure higher than the hydrostatic pressure on the seabed without at the same time allowing the ingress of water if the relative pressures are reversed.

Furthermore, the actuatable connection assembly 30 is designed to be connected to water circulating means 36 that will be described hereinbelow and has a second connection member 38 designed to be engaged in the coupling receptacle 37 of one or other of the two, launch 12 and receiver trap 14, devices.

The water circulating means 36 which, unlike the venting device 40, allow water to enter the tubular body 20 at the hydrostatic pressure, consist of a controllable mobile system 50 extended by a coupling 52, which ends in the second connection member 38. The controllable mobile system 50 or Subsea Pigging Unit (SPU), is designed to allow water initially at the hydrostatic pressure to pass, to filter it in order to rid it of impurities, and, as appropriate, to introduce corrosion inhibitors to it and then inject it into the upstream chamber 26 which is itself at a lower pressure.

Figure 2:
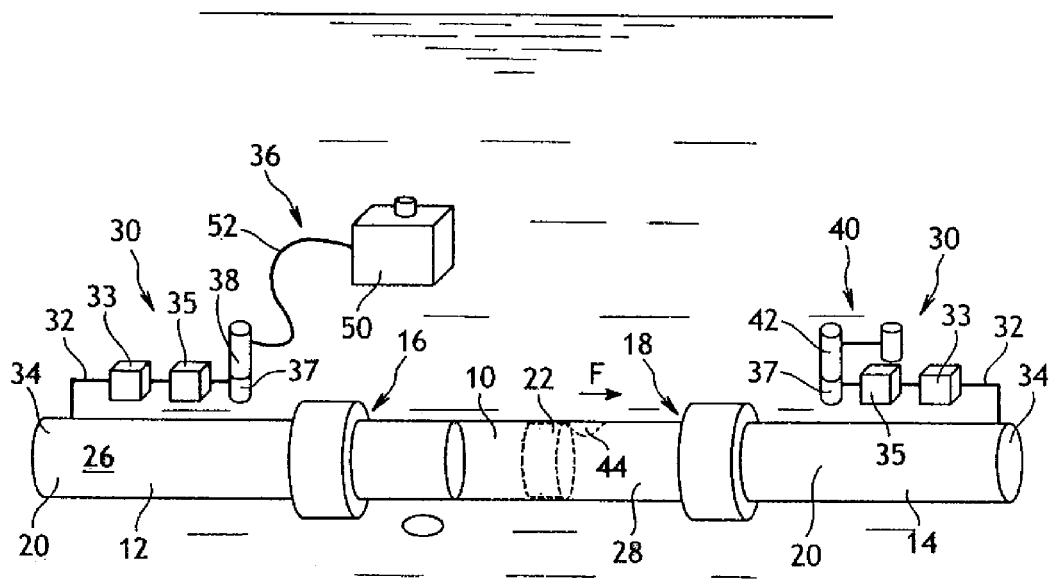
FIG. 2 is a schematic view of the invention depicted in FIG. 1 according to a second step.

Reference will now be made to FIG. 2 in order to detail the method for driving the scraper 22 that the present installation is able to employ.

This FIG. 2 again shows the subsea pipe 10, the ends 16, 18 of which have been coupled in a watertight fashion to the launch device 12 and the receiver trap device 14 respectively, in the continuation thereof.

In a way that is entirely symmetrical, the receiver trap device 14 has been coupled in a watertight manner to the second end 18 of the subsea pipe 10. Thus, the subsea pipe 10 and the two devices 12, 14 define one single space that is divided into two by the scraper 22 to form the upstream chamber 26 and the downstream chamber 28.

Furthermore, the controllable mobile system 50 is connected to the actuatable connection assembly 30 of the launch device 12 via the second connection member, engaged in its coupling receptacle 37. At the other end 18 of the pipe 10, the venting device 40 is connected to the actuatable connection assembly 30 of the receiver trap device 40 by way of the first connection member 42.

As illustrated by FIG. 2, the scraper 22 has left the tubular body 20 for the subsea pipe 10 according to an embodiment which will now be described.

Initially, the subsea pipe 10, the upstream 26 and downstream 28 chambers are at a pressure lower than the hydrostatic pressure obtaining at the seabed 11, for example at atmospheric pressure. The subsea pipe may be filled with water or with air or alternatively with a mixture of both. Next, the controllable mobile system 50 is controlled by way of a subsea robot, not depicted, for example, so as to allow water from the seabed to enter the upstream chamber via the launch device 12. The internal pressure in the upstream chamber 26 increases until it reaches a level equivalent to the hydrostatic pressure, by means of which the scraper 22 is driven in a translational movement toward the receiver trap device 14 in the direction of the arrow F because the pressure in the downstream chamber 28 is itself, at least as the scraper 22 starts to move, at a lower pressure of the order of atmospheric pressure.

However, during this step, the water or the air initially contained in the downstream chamber 28 becomes compressed until it reaches the hydrostatic pressure. As the pressures in the two chambers 26, 28 have now equalized, additional pumping means that will be described hereinafter are needed to inject water into the upstream chamber 26 and complete the travel of the scraper 22 which in theory ends in the receiver trap device 14. This is when the venting device 40 is brought into operation in order to allow the pressurized water or air contained in the downstream chamber 28 to escape.

However, if it encounters an obstacle 44, the scraper 22 is liable to have its translational movement along the subsea pipe 10 impeded. Such an obstacle 44 may for example be brought about by partial crushing of the pipe. In such a case, the scraper 22 cannot in any way overcome the obstacle 44.

Figure 3:
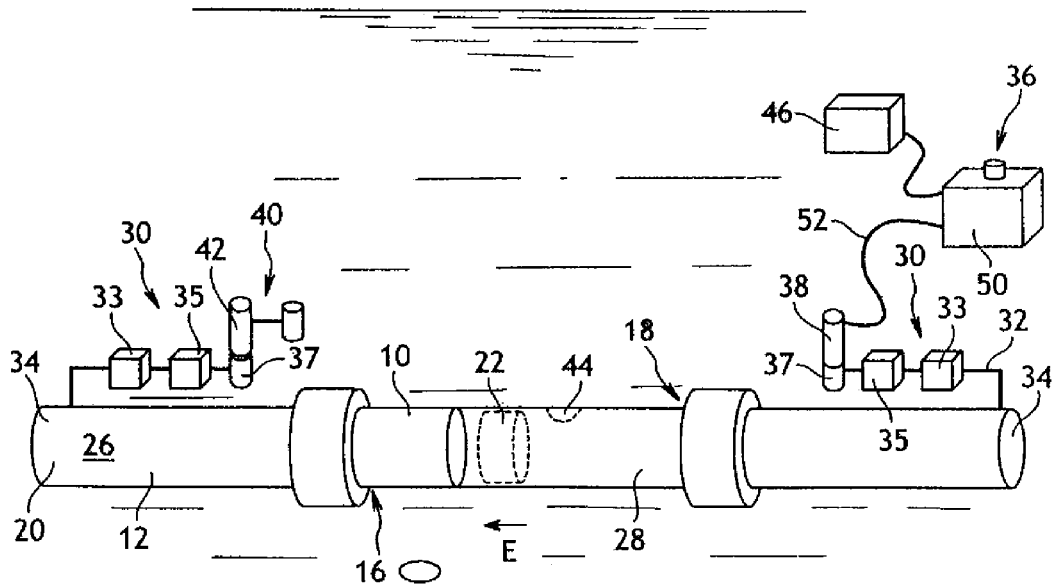
FIG. 3 is a schematic view of the invention depicted in FIG. 1 according to a third step.

Thus, according to the invention, the pressures in the two, upstream 26 and downstream 28, chambers are first of all equalized before the pressure in the downstream chamber 28 is increased in order to drive the scraper 22 in the opposite direction E toward the launch device 12 as shown by FIG. 3.

To do this, first of all, the water circulating means 36 and the venting device 40 on the launch 12 and receiver trap 14 devices are switched over. Thus, the controllable mobile system 50 is transferred to the receiver trap device 14 to which it is connected via the second connection member 38 that is engaged in the coupling receptacle 37 of the actuatable connection assembly 30 of the receiver trap device 14.

In conjunction with this, the venting device 40 is linked to the launch device 12 by engaging its first connection member 42, in place of the second 38, in the coupling receptacle 37.

In that way, the functions of the launch device 12 and of the receiver trap device 14 have been switched over, the former becoming the receiver trap device, and the latter the launch device.

According to the method according to the invention, water is then allowed to pass into the downstream chamber 28 in order to bring it to a pressure equivalent to that of the hydrostatic pressure, provided it is not already so, and therefore to that of the upstream chamber 26. In that way, the scraper 22 finds itself in equilibrium and does not experience any influence that might drive it in a translational movement.

Then, in order to increase the pressure in the downstream chamber 28 in order to bring it to a pressure higher than the hydrostatic pressure obtaining in the upstream chamber 26, pressurized water is injected, as would have been done in the other direction if no obstacle had been encountered, by means of a pump mounted on a remote controlled robot 46 for example. In this way, the scraper 22 is then driven in the opposite direction E, toward the device, which was initially the launch device 12, in which it can be caught and stored again.

Thus, simply by causing the receiver trap device 14 to act as a launch device, the scraper 22 can be retrieved without having to dismantle the subsea pipe 10 or section it.

The installation according to the invention is of considerable economic benefit since, aside from retrieving the scraper 22, there is no longer any need to produce separate receiver trap and launch devices; just one standard device can be produced that is able to fulfill both functions: the one when it is connected to the controllable mobile system and the other when it is connected to the venting member.

The invention claimed is:

1. A method for driving a scraper through a subsea pipe that is designed to be laid on the seabed which is at a given hydrostatic pressure, wherein said subsea pipe has two opposite ends, and a sole fluid connection between said opposite ends is within the subsea pipe, the method comprising
   providing a launch device at one end of said subsea pipe and a receiver trap device at the other end of said subsea pipe,
   providing said scraper to slide inside said subsea pipe to therein delimit two watertight chambers, including an upstream chamber between said launch device and said scraper and a downstream chamber between said receiver trap device and said scraper, providing said scraper able to be launched into said pipe from said launch device toward said receiver trap device,
   bringing said subsea pipe to an internal pressure lower than said hydrostatic pressure,
   allowing water from said seabed to enter said upstream chamber via said launch device thereby bringing said upstream chamber to said hydrostatic pressure to drive said scraper through said subsea pipe toward said receiver trap device;
   allowing water to enter said downstream chamber via said receiver trap device in order to thereby equalize the pressure of said two chambers with respect to the hydrostatic pressure; and
   injecting a pressurized fluid into said downstream chamber via said receiver trap device to increase the pressure in said downstream chamber to a pressure higher than the hydrostatic pressure and sufficient to drive said scraper in an opposite direction, toward said launch device, whereby the respective roles of said launch device and of said receiver trap device are reversed.

2. The drive method as claimed in claim 1, wherein bringing said subsea pipe to an internal pressure lower than said hydrostatic pressure comprises bringing said subsea pipe to an internal water pressure about equal to atmospheric pressure.

3. The drive method as claimed in claim 1, further comprising releasing pressure in said downstream chamber via said receiver trap device when said scraper is being driven toward said receiver trap device.

4. The drive method as claimed in claim 1, further comprising releasing the water in said upstream chamber which is at the hydrostatic pressure via said launch device when said scraper is being driven in said opposite direction toward said launch device.

5. The drive method as claimed in claim 1, further comprising providing a single controllable mobile system and allowing water to enter said launch device and said receiver trap device by means of said single controllable mobile system.

6. An installation for driving a scraper through a subsea pipe which is designed to be laid on a seabed at a given hydrostatic pressure there, the installation comprising
- a subsea pipe having two opposite ends, and a sole fluid connection between said opposite ends is within the subsea pipe,
- a launch device at a first one of said opposite ends of said subsea pipe,
- a receiver trap device at a second one of said opposite ends of said subsea pipe,
- a scraper shaped and operable to slide inside said subsea pipe and to block passage of water, thereby delimiting two watertight chambers in said subsea pipe, said two chambers comprising an upstream chamber between said launch device and said scraper and a downstream chamber between said receiver trap device and said scraper, said scraper being configured and operable to be launched into said subsea pipe from said launch device toward said receiver trap device, by initially bringing said subsea pipe to an internal pressure lower than said hydrostatic pressure,
- said launch device being equipped with a first receiver assembly actuatable to allow water from said seabed surrounding said installation and at the hydrostatic pressure to enter said upstream chamber via said launch device to bring said upstream chamber to said hydrostatic pressure and thereby operable to drive said scraper toward said receiver trap device;
- said receiver trap device also being equipped with a second receiver assembly actuatable to allow water to enter said downstream chamber via said receiver trap device to equalize the pressure of said two chambers with respect to the hydrostatic pressure, and said receiver trap device is also operable for injecting a pressurized fluid into said downstream chamber to increase the pressure in said downstream chamber to a pressure higher than the hydrostatic pressure for driving said scraper in an opposite direction and toward said launch device, whereby respective roles of said launch device and of said receiver trap device are reversed.

7. The installation as claimed in claim 6, wherein each of said receiver trap and said launch devices is equipped with a respective said receiver assembly actuatable to allow water to pass said receiver assembly.

8. The installation as claimed in claim 7, further comprising a water circulator coupled to each of said first and second actuatable receiver assemblies, operable to allow water to enter said devices.

9. The installation as claimed in claim 7, further comprising a valve-forming venting device coupled to said actuatable receiver assembly and operable to prevent water from entering said devices.

10. The drive method of claim 3, further comprising releasing the water in said upstream chamber which is at the hydrostatic pressure via said launch device when said scraper is being driven in said opposite direction toward said launch device.

* * * * *